Figure 1:
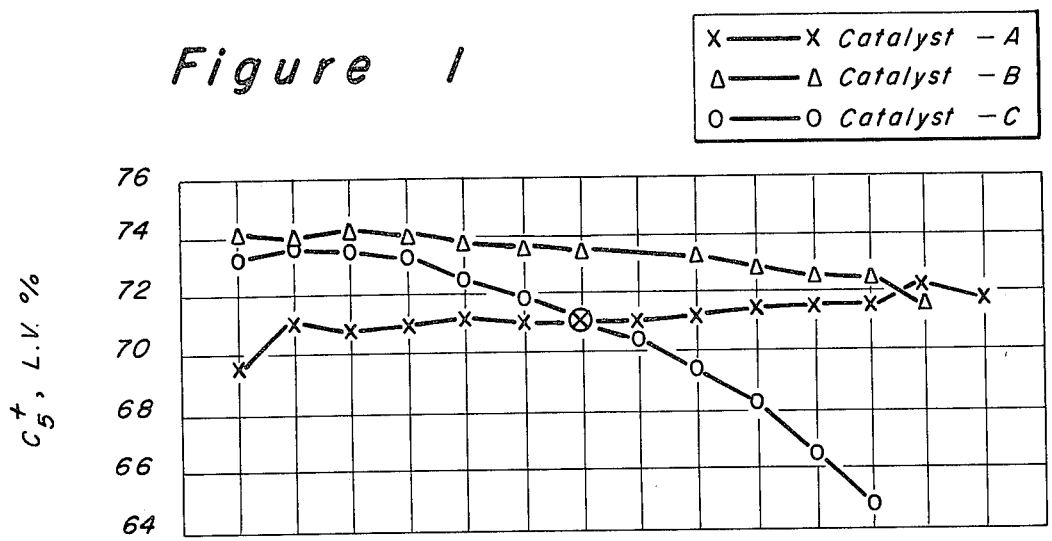

United States Patent [19]

McKay

[11] 4,367,136

[45] Jan. 4, 1983

[54] CATALYST REGENERATION

[75] Inventor: Dwight L. McKay, Bartlesville, Okla.

[73] Assignee: Phillips Petroleum Company, Bartlesville, Okla.

[21] Appl. No.: 274,981

[22] Filed: Jun. 18, 1981

Related U.S. Application Data

[62] Division of Ser. No. 117,927, Feb. 4, 1980, Pat. No. 4,335,021.

[51] Int. Cl.³ .............................................. C10G 11/18
[52] U.S. Cl. ................................ 208/120; 208/52 CT; 252/417; 252/454
[58] Field of Search ............................ 208/120, 52 CT

[56] References Cited

U.S. PATENT DOCUMENTS

| | | | |
|---|---|---|---|
| 3,180,839 | 4/1965 | Connor et al. ........................ | 252/439 |
| 3,696,025 | 10/1972 | Chessmore et al. ................. | 208/113 |
| 3,711,422 | 1/1973 | Johnson et al. ...................... | 208/114 |
| 3,808,121 | 4/1974 | Wilson et al. ........................ | 208/113 |
| 3,977,963 | 8/1976 | Readal et al. ........................ | 208/120 |
| 4,036,740 | 7/1977 | Readal et al. ........................ | 208/120 |
| 4,083,807 | 4/1978 | McKinney et al. ............. | 208/120 X |
| 4,169,784 | 10/1979 | Nielsen et al. ....................... | 208/113 |

Primary Examiner—Delbert E. Gantz
Assistant Examiner—G. E. Schmitkons

[57] ABSTRACT

The regeneration of cracking catalyst containing both manganese and antimony in a temperature range of 1260°–1280° F. has been found to result in unexpected sharp maximum of the $CO_2/CO$ ratio in the regenerator off-gas.

4 Claims, 5 Drawing Figures

Catalyst Life, Days On Oil

Catalyst Life, Days On Oil

CATALYST REGENERATION

This is a division of application serial No. 117,927, filed Feb. 4, 1980, now U.S. Pat. No. 4,335,021, 6/15/82.

This invention relates to the regeneration of catalysts that are useful for cracking hydrocarbons. In another aspect, this invention relates to a hydrocarbon cracking process.

BACKGROUND

It is well known in the art that cracking of hydrocarbons with silica or silica/alumina base catalysts produces coke on such catalysts which can be burned off. One of the problems arising in the cracking step consists in the detrimental effects brought about by such metals as nickel, vanadium, and iron contained in many hydrocarbon feedstocks. These metals cause production of hydrogen and coke. A problem arising in the catalyst regeneration step resides in the fact that the ratio of carbon dioxide to carbon monoxide normally decreases with increasing temperature. Therefore, although high temperatures are a desirable process parameter, it is not feasible to increase the temperature since this would lead to a further decrease in an already low carbon dioxide to carbon monoxide ratio in the off gases.

It has been claimed in the art that antimony, bismuth and manganese added to a cracking catalyst increased the carbon dioxide to carbon monoxide ratio. The art gives examples utilizing antimony and bismuth. There is a continuing interest in increasing the $CO_2/CO$ volume ratio in a catalyst regeneration step.

STATEMENT OF THE INVENTION

It is thus one object of this invention to provide a process for combusting carbonaceous materials on catalyst particles with a high carbon dioxide to carbon monoxide ratio.

Another object of this invention is to provide a cracking process including a catalyst regeneration step in which process both the detrimental effects of metals such as nickel, vanadium, and iron are mitigated and the $CO_2/CO$ ratio of the regeneration off gases is maximized.

These and other objects, advantages, details, and features of this invention will become apparent to those skilled in the art from the following detailed description thereof and the appended claims.

In accordance with this invention it has now been found that carbonaceous material accumulated on cracking catalyst can be burned off with a very high $CO_2/CO$ volume ratio in the produced gases if the catalyst contains both antimony and manganese and if the combustion is carried out in a very limited temperature range of 1260°–1280° F.

Thus, in accordance with one embodiment of this invention a process for combustion of carbonaceous material is provided for.

In accordance with another embodiment of this invention a cracking process is provided for in which a hydrocarbon feedstock is cracked in a cracking zone with a cracking catalyst containing manganese and antimony; the cracking catalyst containing manganese and antimony is then subjected to a regeneration by contacting it with a free oxygen containing gas at a temperature of 1260°–1280° F.; thereafter the regenerated cracking catalyst is again utilized for the cracking step.

It has surprisingly been found that manganese and antimony together result in a synergistic improvement and increase of $CO_2/CO$ ratio of the regenerator off-gas when these metals are present on a catalyst in a cracking/regeneration cycle. Manganese and antimony are passivating agents for the contaminating metals such as nickel, vanadium and iron causing a reduction of hydrogen and coke produced during the cracking process and also have the additional function of strongly increasing the $CO_2/CO$ ratio as described. Antimony or a compound thereof and manganese or a compound thereof together in addition to their metals passivation effect cause an increase in the carbon combustion from catalyst during the regeneration thus releasing more heat in the regenerator. At the same time, the quantity of carbon monoxide released is reduced. The latter is of particular significance where a portion or all of the regenerator off-gases are released to the atmosphere.

FEEDSTOCKS

Hydrocarbon feedstocks to the catalytic cracking process of this invention encompass all the oils usually contemplated for catalytic cracking processes. The initial boiling point of the hydrocarbon feedstocks envisaged generally is above 204° C. Examples of such feedstocks include gas oils, fuel oils, cycle oils, slurry oils, topped crudes, shale oils, oils from tar sands, oils from coal or coal liquefaction, and mixtures of such oils. The hydrocarbon feedstocks contemplated for this invention are those containing significant concentrations of contaminating metals such as vanadium, iron and nickel. Since these contaminating metals tend to concentrate in the least volatile fractions of these feedstocks, cracking of heavy oils is one of the most difficult procedures in the art of hydrocarbon cracking and one of the most important applications of this invention.

The concentration of manganese and antimony on the cracking catalyst can be related to the total effective metals content of the feedstock as shown in the following table.

| Total Effective Metals in Feedstock (ppm)* | Mn + Sb Concentration in Catalyst, Wt. %** |
|---|---|
| 1–40 | 0.01–0.6 |
| 40–100 | 0.05–0.8 |
| 100–200 | 0.1–1 |
| 200–300 | 0.15–1.5 |
| 300–800 | 0.2–2 |

*"Total effective metals" is the sum of the concentration of vanadium and iron plus four times the concentration of nickel and copper.
**Based on the weight of catalyst prior to addition of manganese and antimony.

CRACKING CATALYSTS

Cracking catalysts are compositions useful for cracking hydrocarbons in the absence of added hydrogen. They are used to convert the hydrocarbon feedstocks having a normal boiling point above 204° C. to more volatile compounds, e.g., gasoline and light distillates. Generally they contain silica or silica/alumina, frequently in association with zeolitic materials. These zeolitic materials can be naturally occurring or synthetic, and they usually are subjected to ion exchange treatment to improve the activity of the catalyst in which they are incorporated, by replacing at least part of the original alkali metal or alkaline earth cations with rare earth element cations and hydrogen ions, or with ions capable of conversion to hydrogen ions.

Unused cracking catalyst contains essentially no vanadium, iron, and nickel. Their concentrations in unused catalyst will not exceed 0.06 weight percent vanadium, 0.8 weight percent iron, and 0.02 weight percent nickel. These concentrations refer to the total weight of the unused catalyst, but excluding added manganese and antimony treating agents.

TREATING AGENTS

Manganese that is used to treat the contaminated catalyst can be added as the elemental metal, or it can be applied as a compound of manganese. Suitable compounds include manganese oxides, such as manganese monoxide MnO, manganese sesquioxide $Mn_2O_3$, manganous-ic oxide $Mn_3O_4$, and manganese dioxide $MnO_2$, manganese sulfides such as manganous sulfide MnS and manganic sulfide $MnS_2$, salts of carboxylic acids such as manganese acetate $Mn(C_2H_3O_2)_2$, and manganese oxalate $MnC_2O_4$, salts of mineral acids such as manganese nitrate $Mn(NO_3)_2$, manganese sulfate $MnSO_4$ and $Mn_2(SO_4)_3$, and manganese halides such as manganese fluorides and manganese chlorides, and manganese phosphates such as manganese orthophosphate $Mn_3(PO_4)_2$ and manganese ammonium phosphate $Mn(NH_4)PO_4$.

The second necessary ingredient in this invention in addition to manganese is antimony. Elemental antimony, inorganic antimony compounds and organic antimony compounds or mixtures of such antimony sources can be utilized.

Examples of some inorganic antimony compounds which can be used include antimony oxides such as antimony trioxide, antimony tetroxide, and antimony pentoxide; antimony sulfides such as antimony trisulfide and antimony pentasulfide; antimony selenides such as antimony triselenide; antimony tellurides such as antimony tritelluride; antimony sulfates such as antimony trisulfate; antimonic acids such as metaantimonic acid, orthoantimonic acid and pyroantimonic acid; antimony halides such as antimony trifluoride, antimony trichloride, antimony tribromide, antimony triiodide, antimony pentafluoride and antimony pentachloride; antimonyl halides such as antimonyl chloride and antimonyl trichloride; antimonides such as indium antimonide; and the like. Of the inorganic antimony compounds, those which do not contain halogen are preferred. Although organic antimony compounds for use in the preparation of the antimony/manganese-containing catalysts preferably contain about 3 to about 54 carbon atoms for reasons of economics and availability, organic antimony compounds outside this range are also applicable. Thus, organic polymers containing antimony can be employed as the organic antimony compound. In addition to carbon and hydrogen, the organic antimony compound can contain elements such as oxygen, sulfur, nitrogen, phosphorus or the like. Examples of some organic antimony compounds which can be used in the preparation of the antimony/manganese-containing catalysts include antimony carboxylates such as antimony triformate, antimony trioctoate, antimony triacetate, antimony tridodecanoate, antimony trioctadecanoate, antimony tribenzoate, and antimony tris(cyclohexanecarboxylate); antimony thiocarboxylates such as antimony tris(thioacetate), antimony tris(dithioacetate) and antimony tris(dithiopentanoate); antimony thiocarbonates such as antimony tris(O-propyl dithiocarbonate), antimony carbonates such as antimony tris(ethyl carbonate); trihydrocarbylantimony compounds such as triphenylantimony; trihydrocarbylantimony oxides such as triphenylantimony oxide; antimony salts of phenolic compounds such as antimony triphenoxide; antimony salts of thiophenolic compounds such as antimony tris(thiophenoxide); antimony sulfonates such as antimony tris(benzenesulfonate) and antimony tris(p-toluenesulfonate); antimony carbamates such as antimony tris(diethylcarbamate); antimony thiocarbamates such as antimony tris(dipropyldithiocarbamate), antimony tris(phenyldithiocarbamate) and antimony tris(butylthiocarbamate); antimony phosphites such as antimony tris(diphenylphosphite); antimony phosphates such as antimony tris(dipropyl phosphate); antimony thiophosphates such as antimony tris(O,O-dipropyl thiophosphate) and antimony tris(O,O-dipropyl dithiophosphate) and the like. The last compound is also known as antimony tris(O,O-dipropyl phosphorodithioate), and is the presently preferred source of antimony, due in part to its solubility in hydrocarbons and its commercial availability. Mixtures of any two or more applicable substances comprising antimony can be employed.

The cracking catalyst of this invention can be one that during the cracking process has become contaminated with metals such as vanadium, iron and/or nickel and thereafter has been provided with manganese and antimony or respectively compounds of those metals to at least partially passivate the detrimental metal. It is, however, also within the scope of this invention that the combination of manganese and antimony or compounds thereof are already present on the unused cracking catalyst. The combination of antimony and manganese on the cracking catalyst causes a passivation of the metals or respectively prevents at least some of the detrimental effects of metals such as vanadium, nickel, and iron otherwise occuring. Furthermore, the combination of the two metals, manganese and antimony results in the surprising effect of very significantly increasing the $CO_2/CO$ ratio in the off-gases of the catalyst regenerator.

The cracking catalyst of this invention contains generally about 0.01 to 8 weight percent, preferably about 0.02 to 2 weight percent of managanese and about 0.01 to 8 weight percent, preferably about 0.02 to 2 weight percent of antimony. These concentrations are expressed as the elemental metal and are based on the weight of the total catalyst after treating, i.e. on the weight of the catalyst and the added metals as 100 percent. The weight ratio of manganese to antimony utilized on the catalyst of this invention generally is in the range of 10:1 to 1:10, preferably in the range of 2:1 to 1:2.

A variety of methods may be used to apply the manganese and antimony treating agents to the catalyst. They may be added to the cracking catalyst as finely divided solids and dispersed by rolling, shaking, stirring, etc. Another possibility is to dissolve the Mn and Sb source materials in a suitable solvent, aqueous or organic, and to use the resulting solution to impregnate the cracking catalyst followed by removal of the solvent. Alternatively the Mn and Sb source may be dissolved or dispersed in the hydrocarbon feedstock to the cracking process where the manganese and antimony are deposited on and retained by the catalyst.

PROCESS CONDITIONS

In the process of this invention catalytic cracking of feedstocks is effected either in a fixed catalyst bed or with a fluidized catalyst operation. The latter is preferred. Specific conditions in the cracking zone and the regeneration zone of a fluid catalytic cracker depend upon the feedstock used, the condition of the catalyst, and the product sought. In general conditions in the cracking zone include:

Temperature: 427°–649° C. (800°–1200° F.)
Time: 1–40 seconds
Pressure: 10 kPa to 21 MPa (0.1 to 205 atm.)
Catalyst/oil ratio: 3/1 to 30/1, by wt.

Conditions in the regeneration zone generally include:

Temperature: 1260°–1280° F.
Time: 2–40 minutes
Pressure: 10 kPa to 21 MPa (0.1 to 205 atm.)
Air rate (at 16° C., one atm.): 100–250 ft.$^3$/lb. coke, or 6.2–15.6 m$^3$/kg coke The following examples are intended to illustrate the invention and describe further preferred features without undue limitation of the invention.

EXAMPLE I

A commercial fluid cracking catalyst comprising amorphous silica/alumina and rare earth cation-exchanged zeolite, which had been used in a commercial fluid catalytic cracker until it had attained equilibrium composition with respect to metals accumulation (catalyst was being removed from the process system at a constant rate) was used to demonstrate the effect of being treated with both manganese and antimony. Table I summarizes the composition as determined by analysis, and some pertinent physical properties of this catalyst, designated cataylst O.

TABLE I

| | |
|---|---|
| Surface area, m$^2$/g | 74.3 |
| Pore vol., ml/g | 0.29 |
| Composition, wt. % | |
| Aluminum | 21.7 |
| Silicon | 24.6 |
| Sodium | 0.39 |
| Vanadium | 0.60 |
| Iron | 0.90 |
| Nickel | 0.38 |
| Cerium | 0.40 |
| Carbon | 0.06 |

Portions of catalyst O were used to prepare four catalysts containing manganese and/or antimony as follows.

Catalyst A was prepared by adding 0.4434 g of powdered MnS and 0.6114 g of powdered Sb$_2$(SO$_4$)$_3$ to 35.0 g of dry catalyst O in a tubular quartz reactor. These components were mixed by fluidization for 10 minutes at room temperature with nitrogen, then heated to 482° C. while fluidization with nitrogen continued. Nitrogen was replaced with hydrogen and the temperature was increased to 649° C. Nitrogen replaced hydrogen and the catalyst was fluidized for five minutes at temperature to purge the reactor after which the catalyst was fluidized with air for 15 minutes at that temperature. Catalyst A contained 0.79 weight percent of both manganese and antimony by calculation.

Catalyst B was prepared by adding 0.3991 g of powdered MnS and 0.5503 g of Sb$_2$(SO$_4$)$_3$ to 36 g of catalyst O. The components were mixed and conditioned during fluidization just as described for catalyst A. Catalyst B contained 0.69 weight percent of both manganese and antimony by calculation.

Catalyst C was prepared by adding 0.4434 g of powdered MnS to 35 g of catalyst O. The components were mixed and conditioned during fluidization just as described for catalyst A. Catalyst C contained 0.79 weight percent of manganese by calculation.

Catalyst D was prepared by adding 0.624 g of Sb$_2$(SO$_4$)$_3$ to 35 g of catalyst O. The components were mixed and conditioned during fluidization just as described for catalyst A. Catalyst D contained 0.79 weight percent of antimony by calculation.

Catalysts O and A were evaluated to crack a West Texas topped crude oil. Prior to that run catalyst A was aged by being subjected to ten cycles of the following treatment after receiving the conditioning already described. The catalyst at about 482° C. was fluidized with nitrogen for one minute, then heated to about 510° C. during two minutes while fluidized with hydrogen, then maintained at 510° C. for one minute while fluidized with nitrogen, then heated to about 649° C. for 10 minutes while fluidized with air, and then cooled to about 482° C. during 0.5 minutes while fluidized with air. After 10 such cycles it was cooled to room temperature while being fluidized with nitrogen and was tested. Catalysts O and A were tested in fluidized bed reactors at 510° C. and atmospheric pressure using 0.5 minute cracking periods with intervening regeneration periods at about 649° C.

Pertinent properties of the topped West Texas crude oil used in these runs are tabulated in U.S. Pat. No. 4,111,845 at column 8.

A series of runs was made in which the catalyst/oil ratio was varied to obtain the desired range of conversions. Gas and liquid products were analyzed by GLC and the reactor was weighed to determine coke. A smooth curve was obtained from the data points and results at 75 volume percent conversion of the feed are presented in Table III.

TABLE III

| Catalyst | Cat./Oil Wt. Ratio | Coke, Wt. % of Feed | Scf H$_2$/bbl Feed Converted | Gasoline, Vol. % of Feed |
|---|---|---|---|---|
| O | 7.4 | 16.4 | 800 | 54.8 |
| A | 6.15 | 12.6 | 360 | 59.0 |

The presence of 0.79 wt. % each of manganese and antimony on the used cracking catalyst decreased the coke produced by 23%, decreased the hydrogen produced by 55%, and increased the yield of gasoline by 7.7%.

EXAMPLE II

Catalysts O, A, B, C, and D all were used separately to crack the topped crude in exactly the manner described in example I, 0.5 minutes at 510° C. and atmospheric pressure. After addition of the oil had ceased, fluidization of the catalyst with nitrogen continued for 10 minutes to strip hydrocarbons from the reactor. Coked catalysts were regenerated with air and the CO$_2$/CO ratio in the off-gas was determined by measuring their concentrations by GLC. Portions of the off-gas were collected by water displacement in receivers large enough to contain the off-gas produced in several minutes. Regeneration was generally complete within 40 minutes, and, when it was desired, several samples of off-gas were obtained during a single regeneration.

Figure 2:
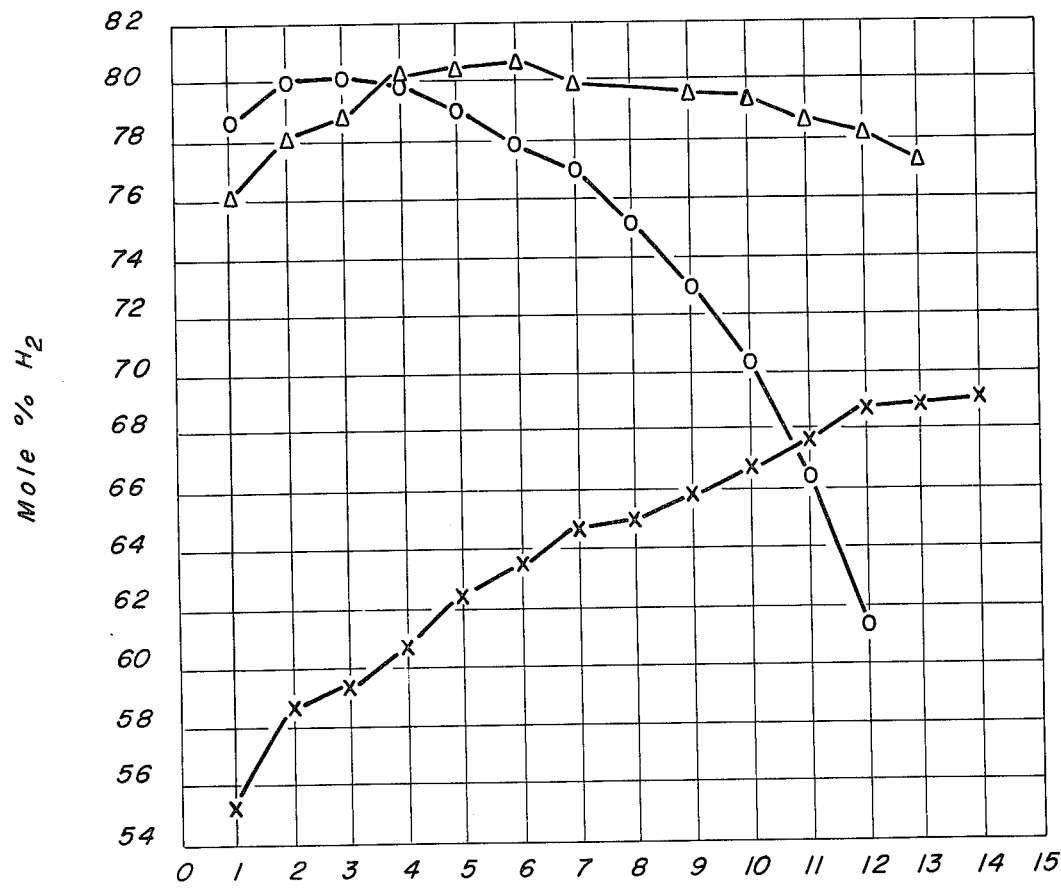
Figure 3:
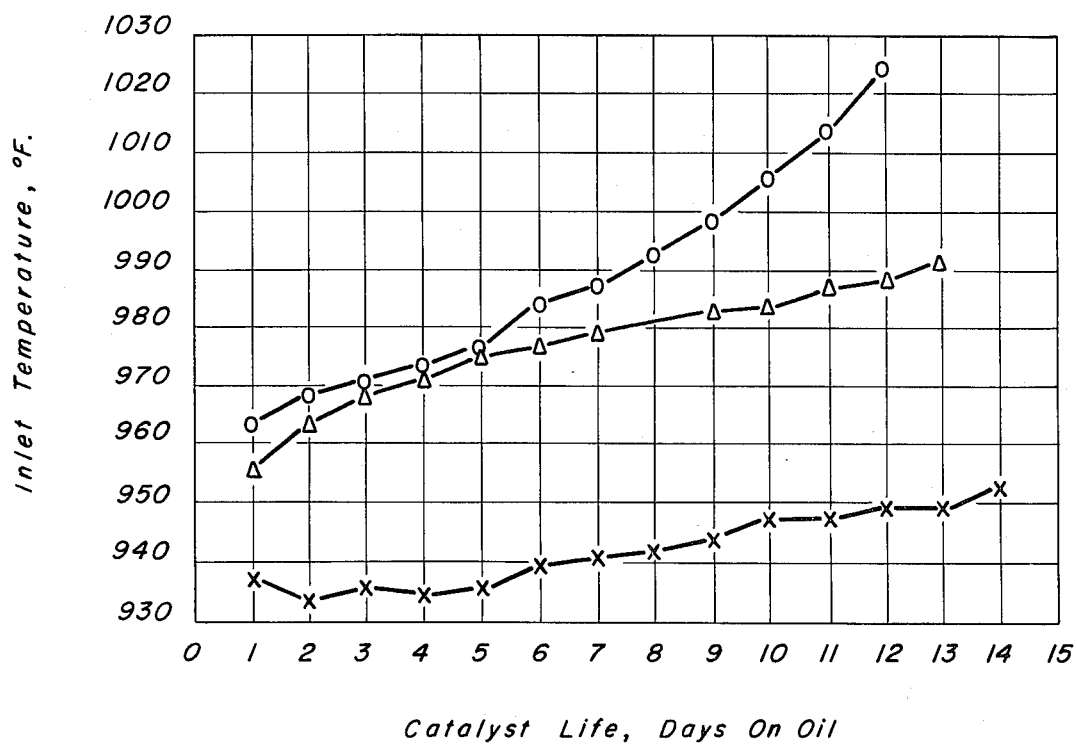
Figure 4:
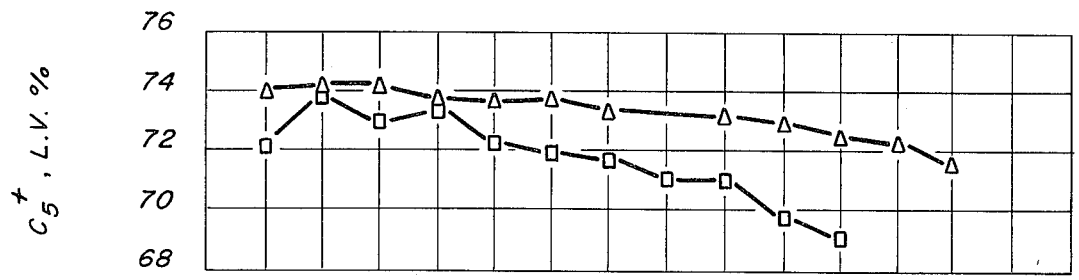
Figure 5:
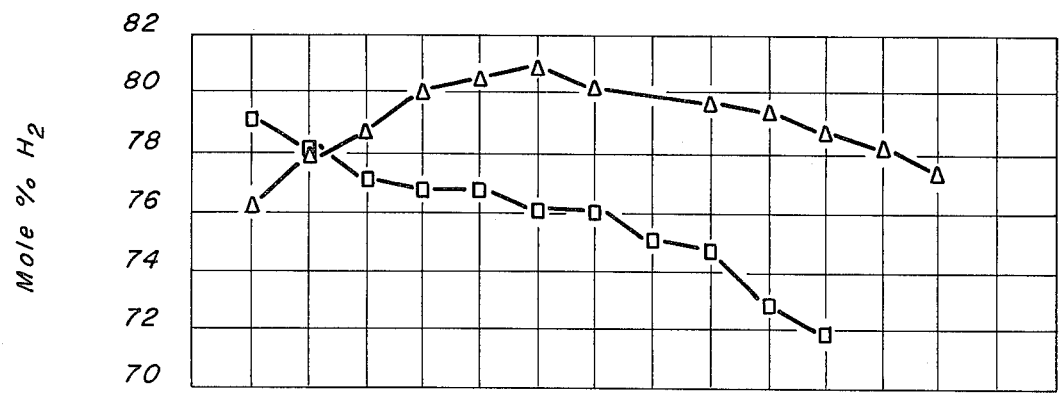
Figure 6:
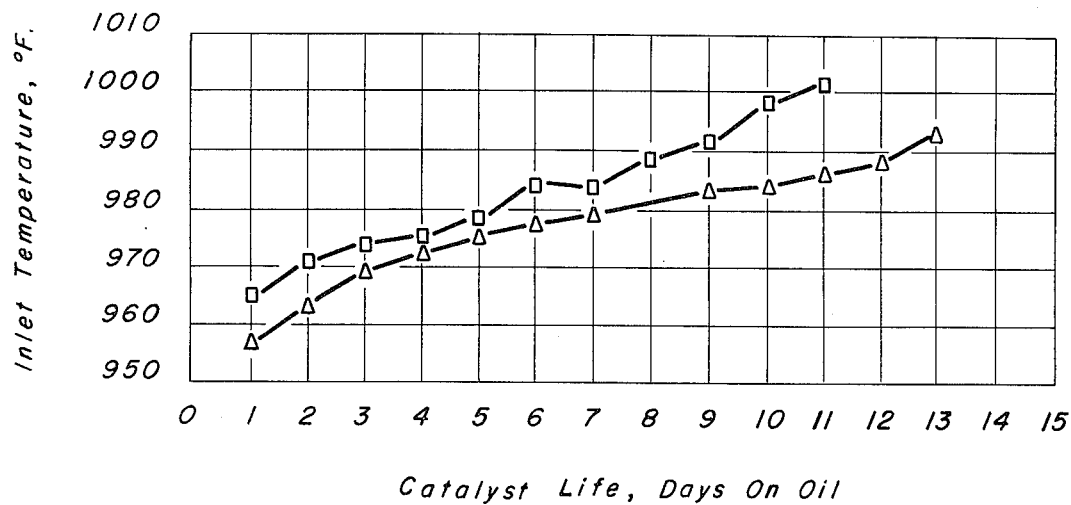

These samples were always collected during the first 20 minutes of oxidation; the concentration of carbon oxides in the regeneration off-gas was constant during that part of the process. A thermocouple in the bed of fluidized catalyst being regenerated indicated its temperature which changed with time because of the heat liberated during regeneration. In some runs the air for regeneration was saturated with water vapor at about 24° C. before being introduced into the reactor; in other runs the air was not humidified. This difference in treatment is not believed to have affected the $CO_2/CO$ ratio in the off-gas. Table IV summarizes pertinent conditions and results from regeneration of coked catalysts O, A, B, C, and D as described. These data have also been plotted to show the relation between $CO_2/CO$ mole ratio and the regeneration temperature in FIGS. 1-5.

The figures show that the $CO_2/CO$ ratio from regenerating untreated catalyst O declines monotonically from about 5 to about 2 as the temperature of regeneration increases from about 850° to about 1350° F. In contrast catalysts A and B, both of which contain manganese and antimony in equal concentrations, show unexpected activity to oxidize carbon more completely in the temperature range of about 1260° to 1280° F. Data from catalyst A were obtained in runs that span a large fraction of the temperature range generally used to regenerate FCC catalyst. Catalyst B, prepared subsequently, was used in runs to define in detail the temperature range disclosed by catalyst A. Regeneration off-gas from it showed essentially identical $CO_2/CO$ ratios versus regeneration temperature, and confirm that the particularly effective temperature range is about 1260°–1280° F.

Catalyst C, treated with manganese only, and which is not a part of this invention, suggests that at about 1050° F. it is particularly effective for carbon oxidation to carbon dioxide. Catalyst D, treated with antimony only, in two runs showed anomalously high $CO_2/CO$ ratios at about 1250° F., but the ratio is substantially smaller than that obtained when antimony was combined with manganese at about the same temperature.

TABLE IV

| Catalyst | Run | Air Humidified? | Regeneration Temp., °F. | Mole Ratio $CO_2/CO$ |
|---|---|---|---|---|
| O | 1 | Yes | 1225 | 2.83 |
| O |   | Yes | 1219 | 2.74 |
| O | 2 | No | 1218 | 2.81 |
| O |   | No | 1190 | 3.09 |
| O | 3 | Yes | 1378 | 2.61 |
| O |   | Yes | 1100 | 3.47 |
| O |   | Yes | 1022 | 3.83 |
| O | 4 | Yes | 1253 | 3.61 |
| O |   | Yes | 1265 | 2.29 |
| O |   | Yes | 1281 | 2.21 |
| O | 5 | Yes | 1155 | 4.05 |
| O |   | Yes | 1173 | 2.62 |
| O |   | Yes | 1335 | 2.07 |
| O | 6 | Yes | 852 | 5.14 |
| O |   | Yes | 875 | 5.31 |
| O |   | Yes | 905 | 4.93 |
| O |   | Yes | 912 | 4.13 |
| A | 7* | Yes | 1260 | 9.65 |
| A | 8 | Yes | 1012 | 4.67 |
| A |   | Yes | 1110 | 2.85 |
| A |   | Yes | 1356 | 3.57 |
| A | 9 | Yes | 1092 | 4.10 |
| A |   | Yes | 1275 | 8.13 |
| A |   | Yes | 1275 | 7.33 |
| A |   | Yes | 1180 | 3.36 |
| A | 10 | Yes | 1320 | 5.31 |
| A |   | Yes | 1212 | 2.92 |
| A |   | Yes | 1055 | 3.62 |
| A | 11 | Yes | 1272 | 8.31 |
| A |   | Yes | 1262 | 3.44 |
| A |   | Yes | 1266 | 3.19 |
| B | 12 | No | 1268 | 9.92 |
| B |   | No | 1266 | 5.37 |
| B |   | No | 1264 | 4.48 |
| B | 13 | No | 1263 | 8.22 |
| B |   | No | 1255 | 4.55 |
| B |   | No | 1250 | 4.46 |
| B | 14 | No | 1260 | 7.08 |
| B |   | No | 1266 | 4.33 |
| B | 15 | No | 1271 | 6.83 |
| B |   | No | 1277 | 4.53 |
| B |   | No | 1283 | 4.49 |
| B |   | No | 1287 | 5.69 |
| B | 16 | No | 1257 | 7.49 |
| B |   | No | 1253 | 4.58 |
| B |   | No | 1247 | 4.81 |
| B |   | No | 1239 | 5.11 |
| B | 17 | No | 1268 | 3.88 |
| B | 18 | Yes | 1262 | 7.17 |
| B |   | Yes | 1264 | 3.54 |
| B | 19 | No | 1263 | 7.04 |
| B |   | No | 1265 | 15.93 |
| B | 20 | No | 1271 | 5.21 |
| B |   | No | 1272 | 9.34 |
| B |   | No | 1279 | 12.34 |
| B | 21 | No | 1258 | 6.03 |
| B |   | No | 1260 | 7.98 |
| B |   | No | 1260 | 14.81 |
| C | 22* | Yes | 1257 | 3.83 |
| C |   | Yes | 1186 | 3.17 |
| C |   | Yes | 1006 | 3.52 |
| C | 23 | Yes | 1060 | 5.39 |
| C |   | Yes | 1237 | 3.18 |
| C |   | Yes | 1350 | 3.87 |
| C |   | Yes | 1108 | 3.31 |
| C | 24 | Yes | 1042 | 5.97 |
| C |   | Yes | 1253 | 3.05 |
| C | 25 | Yes | 1046 | 6.75 |
| C |   | Yes | 1278 | 3.39 |
| C |   | Yes | 1305 | 3.31 |
| D | 26 | Yes | 1239 | 5.41 |
| D |   | Yes | 1187 | 3.01 |
| D |   | Yes | 1113 | 3.51 |
| D |   | Yes | 1018 | 4.02 |
| D |   | Yes | 1266 | 2.47 |
| D | 27 | Yes | 1250 | 2.44 |
| D |   | Yes | 1259 | 2.68 |
| D |   | Yes | 1260 | 4.05 |
| D |   | Yes | 1280 | 2.08 |
| D |   | Yes | 1347 | 2.03 |

*Cracking reaction at 1050° F. (566° C.)

Reasonable variations and modifications apparent to one skilled in the art can be made in this invention without departing from the spirit and scope thereof.

I claim:

1. A process comprising
   (a) contacting a hydrocarbon feedstock with a silica or silica/alumina based cracking catalyst in a cracking zone and under cracking conditions to produce a cracked hydrocarbon product, said cracking catalyst containing both manganese and antimony in a quantity to at least mitigate the detrimental effects of metals such as nickel, vanadium, and iron in the feedstock, and in a ratio of antimony to manganese in the range of 10:1 to 1:10,
   (b) removing said cracked hydrocarbon product from said cracking catalyst,
   (c) contacting said cracking catalyst with free oxygen at a temperature in the range of 1260° to 1280° F. such as to burn off at least a portion of the carbonaceous material accumulated on said cracking catalyst during the cracking step and converting it to $CO_2$ and CO in a high ratio of $CO_2/CO$.

(d) repeating these steps a plurality of times.

2. A process in accordance with claim 1 comprising
(a) removing said cracking catalyst from said cracking zone,
(b) stripping hydrocarbons from said cracking catalyst so removed,
(c) contacting the so stripped cracking catalyst in a regeneration zone with free oxygen,
(d) stripping free oxygen from the so regenerated cracking catalyst,
(e) recycling the regenerated and stripped cracking catalyst to said cracking zone and repeating the cycle.

3. A process in accordance with claim 1 comprising adding both manganese and antimony or compounds of these metals to the cracking catalyst.

4. A process in accordance with claim 3 wherein manganese and antimony or respectively their compounds are added to the cracking catalyst by incorporating an antimony source and a manganese source to the hydrocarbon feedstock.

* * * * *